Patented July 5, 1949

2,475,299

UNITED STATES PATENT OFFICE 2,475,299

POLYSTYRENE TYPE RESINS PLASTICIZED WITH ETHER ALCOHOL ESTER

Frank J. Soday, Baton Rouge, La., assignor to The United Gas Improvement Company, a corporation of Pennsylvania No Drawing. Application February 9, 1944, Serial No. 521,710

1 Claim. (Cl. 260—31.4)

This invention relates to new compositions of matter comprising polystyrene-type resins and certain high-boiling esters.

More particularly, this invention pertains to resinous compositions comprising one or more resins derived by the polymerization or copolymerization of one or more compounds selected from a list comprising styrene and substituted styrene and at least one plasticizing agent selected from a list comprising esters containing an ether linkage.

An object of the invention is to provide resinous compositions which have been plasticized sufficiently to impart a substantial degree of flexibility thereto. Another object of the invention is the provision of molding compositions possessing improved flowing properties at elevated temperatures. A further object of the invention is the provision of a casting composition comprising monomeric and/or partially polymerized styrene and/or substituted styrene containing one or more esters of the type described adapted for the production of castings or other formed objects, particularly objects containing metallic or other inserts. Other objects and advantages of the invention will be apparent to those skilled in the art upon an inspection of the specification and claims.

Styrene, or substituted styrene conforming to the following formula

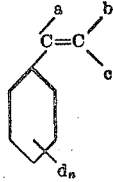

in which $a$, $b$, and $c$ each may represent hydrogen, halogen, or alkyl, $d$ may be halogen or alkyl, and $n$ may be any integer from 0 to 5, may be polymerized to form light-colored, or colorless, resins possessing excellent physical properties. Examples of alkyl groups are methyl, ethyl, propyl, butyl and amyl.

This applies particularly to styrene and to nuclearly substituted styrenes in which the substituent or substituents are halogen or alkyl groups, and especially when the substituents on the nucleus are less than three. In any case, each alkyl group preferably contains less than 6 carbon atoms.

In many cases mono-substitution, either on the ring or on the side chain is preferred.

Examples of substituted styrenes which are particularly well adapted to the production of resins of this type are the nuclear-substituted methyl styrenes, such as m-methyl styrene, p-methyl styrene, and o-methyl styrene.

Particularly desirable resins are obtained by the copolymerization of mixtures of meta methyl styrene, para methyl styrene, and ortho methyl styrene in which meta methyl styrene and para methyl styrene are each present in proportions substantially greater than that of ortho methyl styrene. Excellent results are obtained when the preponderating unsaturated hydrocarbon present in the mixture to be polymerized is meta methyl styrene, followed by para methyl styrene and ortho methyl styrene, in the order given. Good results may be obtained when the preponderating unsaturated hydrocarbon present is para methyl styrene, followed by meta methyl styrene and ortho methyl styrene in the order given.

Copolymers possessing excellent surface hardness characteristics, as well as other desirable properties may be prepared by the polymerization of a mixture of nuclear-substituted methyl styrenes containing from 55 to 75% meta methyl styrene, from 20 to 45% para methyl styrene, and from 1 to 10% ortho methyl styrene.

Polymers possessing unusually good physical properties also may be obtained by the copolymerization of styrene with one or more substituted styrenes, such as the nuclear-substituted methyl styrenes.

Resinous materials possessing very desirous properties may be obtained by mixing polystyrene with one or more polymers obtained from substituted styrenes, such as the nuclear-substituted styrenes. Substituted styrene polymers obtained by the polymerization of a mixture of meta, para, and ortho methyl styrenes, in which the meta isomer predominates, are preferred.

For many uses, however, I have found that the foregoing resins do not possess satisfactory elastic characteristics.

Thus, for example, the use of polystyrene, polymethylstyrene, styrene-methyl styrene copolymers, and/or polystyrene-polymethylstyrene mixtures for the preparation of castings or molded objects containing metallic, or other, inserts, has given unsatisfactory results in certain cases. Thus, for example, the molding or casting may develop cracks around the metallic insert, resulting in a definite reduction in the mechanical strength, and other properties, of the unit.

This is particularly undesirable in the case of certain electrical units, such as condensers, conductors, and the like, where the formation of cracks in the cast or molded object may result in undesirable electrical phenomena, such as corona discharges. In the case of radio and television condensers imbedded in polystyrene or polystyrene-type plastics, the formation of corona discharges in cracks formed in the plastic mass largely interfere with the operation of the unit, and may render it entirely unsuited for this type of work.

In addition, the formation of cracks in the plastic mass in which condensers, or similar units, are imbedded may permit moisture to penetrate the unit, thus impairing its efficiency and rendering it unsuited for certain applications.

I have discovered that the formation of cracks in polystyrene type plastics may be retarded or completely eliminated, and certain of the other physical properties of the material improved, by the incorporation therein of a lauric acid ester of certain alcohol ethers. Such esters are the lauric acid ester of ethylene glycol monoethyl ether, the lauric acid ester of diethylene glycol monoethyl ether, and the lauric acid ester of ethylene glycol monobutyl ether.

Any desired proportion of plasticizing agent of the type described herein may be employed, although care should be taken not to exceed the compatibility limits of the plasticizing agent, or agents, selected and the polystyrene-type plastic. For many purposes I have found that 10%, or even less, of plasticizing agent is sufficient to impart the desired flexibility, as well as other desired properties such as freedom from cracking or checking, to the polystyrene-type plastic. Higher proportions may, of course, be used if desired. I prefer to employ from 1% to 30% and more particularly from 5% to 20% of the ester based on the weight of the resin.

Esters of the type conforming to the foregoing formula may be added to the plastic at any stage of its preparation, such as before, during, and/or after polymerization. Thus the ester, or mixture of ester, may be added to the monomeric styrene and/or substituted styrene prior to, or during, the polymerization thereof, leading to the production of a polymer or copolymer through which the plasticizing agent has been uniformly distributed. This is particularly desirable from the standpoint of the production of castings. Such castings may, of course, contain metallic, or other desired inserts.

On the other hand, a plasticizing agent of the type described may be added to the polystyrene-type plastic at any stage subsequent to the polymerization thereof. The plasticizing agent may be added in any desired manner, such as by masticating a mixture of the plastic and plasticizing agent on hot rolls until a uniform blend has been achieved. Another method comprises the addition of the plasticizing agent to a solution of the plastic in a suitable solvent, followed by removing the solvent, if desired, by any suitable method. This may involve distillation, which may be assisted by the use of steam and/or reduced pressures, working on hot rolls, spray drying, and the like.

The plasticized product then may be further processed, if desired. Thus, it may be subdivided to form a molding powder, or it may be extruded to form rods, tubes, foil, film, and other shapes.

Other ingredients also may be incorporated in the polystyrene-type plastic prior to, during, or after the addition of plasticizing agents of the type described herein, and such additions may be made prior to, during, or after the formation of the plastic. These additional ingredients may include one or more agents selected from a list comprising dyes, pigments, fillers, other plsticizing agents, rubber, both natural and synthetic, and other resinous and/or plastic materials.

The polymerization of the styrene or substituted styrenes employed in the preparation of plastic compositions of the type described herein may be carried out in any desired manner, such as by the application of heat. In addition, certain catalytic agents also may be employed, either alone or in conjunction with the simultaneous, or otherwise, application of heat. Examples of suitable catalytic agents are peroxides, such as hydrogen peroxide, benzoyl peroxide, and the like, metallic halides, metallic halide-organic solvent complexes, and contact agents such as clay, activated clay, alumina, silica gel, and the like.

The advantages to be obtained by the use of my plasticizing agents over those used heretofore may be illustrated by the following examples.

*Example 1*

A mixture of 5 parts of dibutoxyethyl phthalate and 95 parts of monomeric styrene was placed in a cylindrical container, after which an aluminum rod ¼" in diameter and sufficiently long to project above the surface of the monomeric styrene, also was placed in the container. The monomeric styrene then was polymerized by heating for 72 hours at 120° C., 48 hours at 140° C., and 20 hours at 65° C.

Upon removing the polystyrene casting containing the metallic insert from the container, and permitting it to stand overnight, definite signs of cracking were observed. The majority of these cracks originated on the surface of the metallic insert within the casting and penetrated the plastic mass for considerable distances. At the end of one week's storage, the casting was cracked to an extent sufficient to render it useless for any commercial application.

The experiment was repeated, using a number of other commercial plasticizing agents, with the following results.

| Plasticizing Agent | Length of Storage of Plasticized Casting | Appearance of Plasticized Casting |
|---|---|---|
| | Weeks | |
| Xylyl heptadecyl ketone | 8 | Cracked. |
| Triphenyl phosphate | 8 | Do. |
| Benzyl stearate | 8 | Do. |
| Dimethoxy ethyl phthalate | 1 | Do. |
| Diethoxy ethyl phthalate | 1 | Do. |
| Carbitol phthalate | 3 | Do. |
| Diethylene glycol dipropionate | 3 | Do. |
| Methoxy ethyl oleate | 3 | Do. |
| Dioctyl phthalate | 1 | Do. |

In addition to cracking, the majority of the plasticized castings listed showed excessive blushing, crazing, checking, pitting, or other surface imperfections after the indicated storage periods.

The following experiments will serve to illustrate the greatly improved results to be obtained by the use of esters of the type described herein as plasticizing agents for polystyrene-type plastics.

*Example 2*

A casting similar to that obtained in Example 1 was prepared by the polymerization of a mixture of 5 parts of the lauric acid ester of ethylene glycol monoethyl ether and 95 parts of monomeric styrene.

Example 3

This was a repetition of Example 2, with the exception that a mixture of 5 parts of the lauric acid ester of ethylene glycol n-butylether and 95 parts of monomeric styrene was employed in the preparation of the casting.

The plasticized casting was entirely free from cracking and other imperfections after a storage period of 11 months.

Example 4

This was a repetition of Example 2, with the exception that the casting was prepared by the polymerization of a mixture of 5 parts of the lauric acid ester of diethylene glycol monoethyl ether and 95 parts of monomeric styrene.

The plasticized casting obtained was clear and free from surface defects after a storage period of 11 months.

Example 5

Polystyrene plasticized by the addition of 3% of the lauric acid ester of ethylene glycol monobutyl ether is molded at a temperature of 200° C. and a pressure of 2000 pounds per square inch. A colorless, clear molded object possessing excellent mechanical properties is obtained.

Example 6

Polymethyl styrene plasticized by the addition of 3% of the lauric acid ester of ethylene glycol monobutyl ether is extruded in the form of a rod under a pressure of 2500 pounds per square inch and a temperature of 150° C. The rod obtained possesses good surface characteristics and excellent mechanical properties.

Example 7

A styrene-methyl styrene copolymer plasticized by the addition of 3% of the lauric acid ester of ethylene glycol monobutyl ether is molded at a temperature of 180° C. and a pressure of 1800 pounds per square inch. A molded object exactly reproducing the interior of the mold and possessing excellent mechanical properties is obtained.

I claim:

A plastic composition consisting of a resin selected from the group consisting of polystyrene, nuclear substituted methyl styrene polymer and styrenenuclear substituted methyl styrene copolymer plasticized with the lauric acid ester of diethylene glycol monoethyl ether.

FRANK J. SODAY.

REFERENCES CITED

The following references are of record in the file of this patent:

UNITED STATES PATENTS

| Number | Name | Date |
|---|---|---|
| 1,739,315 | Kessler | Dec. 10, 1929 |
| 2,025,048 | Graves | Dec. 24, 1935 |
| 2,098,540 | Charch | Nov. 9, 1937 |
| 2,174,538 | Stoesser | Oct. 3, 1939 |
| 2,193,662 | Alexander | Mar. 12, 1940 |
| 2,285,562 | Britton | June 9, 1941 |

FOREIGN PATENTS

| Number | Country | Date |
|---|---|---|
| 478,822 | Great Britain | Jan. 26, 1938 |
| 487,707 | Germany | Nov. 29, 1929 |